US009456068B2

(12) United States Patent
Dhawan et al.

(10) Patent No.: US 9,456,068 B2
(45) Date of Patent: *Sep. 27, 2016

(54) SYSTEM AND METHOD FOR CONNECTING A USER TO BUSINESS SERVICES

(75) Inventors: Vishal Dhawan, Centreville, VA (US); Timothy M. Price, Rockville, MD (US); Manoj Sindhwani, Oak Hill, VA (US)

(73) Assignee: XTONE, INC., McLean, VA (US)

( * ) Notice: Subject to any disclaimer, the term of this patent is extended or adjusted under 35 U.S.C. 154(b) by 305 days.

This patent is subject to a terminal disclaimer.

(21) Appl. No.: 12/717,888

(22) Filed: Mar. 4, 2010

(65) Prior Publication Data
US 2010/0158208 A1 Jun. 24, 2010

Related U.S. Application Data

(63) Continuation-in-part of application No. 11/514,116, filed on Sep. 1, 2006, now abandoned.

(60) Provisional application No. 60/712,808, filed on Sep. 1, 2005, provisional application No. 61/157,331, filed on Mar. 4, 2009.

(51) Int. Cl.
*H04M 1/247* (2006.01)
*H04M 3/493* (2006.01)
*H04M 1/253* (2006.01)

(52) U.S. Cl.
CPC ......... *H04M 1/2478* (2013.01); *H04M 3/4936* (2013.01); *H04M 1/2535* (2013.01); *H04M 2201/40* (2013.01); *H04M 2250/74* (2013.01)

(58) Field of Classification Search
CPC ............................ G06F 3/167; G06Q 30/0241
USPC ............. 379/265.03, 265.11, 266.01, 265.02
See application file for complete search history.

(56) References Cited

U.S. PATENT DOCUMENTS

| | | | |
|---|---|---|---|
| 5,074,923 A | 12/1991 | Siemers et al. | |
| 5,323,444 A | 6/1994 | Ertz et al. | |
| 6,334,103 B1 | 12/2001 | Surace et al. | |
| 6,408,272 B1 | 6/2002 | White et al. | |
| 6,636,504 B1 * | 10/2003 | Albers et al. | 370/352 |
| 6,636,831 B1 | 10/2003 | Profit, Jr. et al. | |
| 6,738,743 B2 | 5/2004 | Sharma et al. | |
| 6,757,781 B2 | 6/2004 | Williams et al. | |

(Continued)

FOREIGN PATENT DOCUMENTS

WO 96/20448 7/1996

OTHER PUBLICATIONS

U.S. Appl. No. 12/717,893, filed Mar. 4, 2010.
(Continued)

*Primary Examiner* — Amal Zenati
(74) *Attorney, Agent, or Firm* — Nixon & Vanderhye P.C.

(57) ABSTRACT

A system and method for connecting a user to business services monitors all attempts by the user to place outgoing telephone calls. When a user is attempting to place a call to a business, the system checks to see if the business has created a voice application that could be performed for the user. If so, the business' voice application is performed for the user on the user's local device, instead of connecting the user to the business' customer service line. If no voice application is available for the user, then the system connects the user to the business' customer service line, either through a telephone network, or through a data network connection.

25 Claims, 6 Drawing Sheets

(56) References Cited

U.S. PATENT DOCUMENTS

| | | | |
|---|---|---|---|
| 6,829,334 B1 | 12/2004 | Zirngibl et al. | |
| 6,882,974 B2 | 4/2005 | James et al. | |
| 6,901,431 B1 | 5/2005 | Dodrill et al. | |
| 6,977,992 B2 | 12/2005 | Zirngibl et al. | |
| 6,988,070 B2 | 1/2006 | Kawasaki et al. | |
| 7,016,847 B1 | 3/2006 | Tessel et al. | |
| 7,020,609 B2 | 3/2006 | Thrift et al. | |
| 7,062,709 B2 | 6/2006 | Cheung | |
| 7,415,442 B1 * | 8/2008 | Battaglini | G06Q 20/10 235/380 |
| 7,689,426 B2 * | 3/2010 | Matula | 704/270.1 |
| 7,801,283 B2 * | 9/2010 | Harwood | H04M 1/6091 379/88.03 |
| 7,801,306 B2 * | 9/2010 | Reitmeier et al. | 380/217 |
| 2002/0001370 A1 | 1/2002 | Walker et al. | |
| 2002/0059073 A1 | 5/2002 | Zondervan et al. | |
| 2002/0169604 A1 | 11/2002 | Damiba et al. | |
| 2002/0188451 A1 | 12/2002 | Guerra et al. | |
| 2003/0007609 A1 | 1/2003 | Yuen et al. | |
| 2003/0068999 A1 | 4/2003 | Casali et al. | |
| 2003/0144005 A1 | 7/2003 | Videtich | |
| 2003/0233238 A1 | 12/2003 | Creamer et al. | |
| 2004/0006471 A1 | 1/2004 | Chiu | |
| 2004/0010412 A1 | 1/2004 | Chiu | |
| 2004/0068364 A1 | 4/2004 | Zhao et al. | |
| 2004/0151285 A1 | 8/2004 | Sychta | |
| 2004/0163073 A1 | 8/2004 | Krzyzanowski et al. | |
| 2004/0230689 A1 | 11/2004 | Loveland | |
| 2005/0091057 A1 | 4/2005 | Phillips et al. | |
| 2005/0135338 A1 | 6/2005 | Chiu et al. | |
| 2005/0141679 A1 | 6/2005 | Zirngibl et al. | |
| 2005/0163136 A1 | 7/2005 | Chiu et al. | |
| 2005/0234720 A1 | 10/2005 | Paillet et al. | |
| 2005/0283367 A1 | 12/2005 | Ativanichayaphong et al. | |
| 2006/0047511 A1 | 3/2006 | Hussain | |
| 2006/0069701 A1 | 3/2006 | O'Rourke, III | |
| 2006/0122840 A1 | 6/2006 | Anderson et al. | |
| 2006/0293897 A1 | 12/2006 | White et al. | |
| 2007/0143113 A1 | 6/2007 | Nanavati et al. | |

OTHER PUBLICATIONS

U.S. Appl. No. 12/717,881, filed Mar. 4, 2010.
U.S. Appl. No. 12/717,875, filed Mar. 4, 2010.
U.S. Appl. No. 12/717,858, filed Mar. 4, 2010.
U.S. Appl. No. 12/717,854, filed Mar. 4, 2010.
U.S. Appl. No. 12/717,839, filed Mar. 4, 2010.
U.S. Appl. No. 12/717,826, filed Mar. 4, 2010.
U.S. Appl. No. 12/717,897, filed Mar. 4, 2010.
U.S. Appl. No. 12/717,888, filed Mar. 4, 2010.
U.S. Appl. No. 11/514,116, filed Sep. 1, 2006.
Office Action issued on Feb. 26, 2010 in US Appl. No. 11/514,116.

* cited by examiner

SYSTEM AND METHOD FOR CONNECTING A USER TO BUSINESS SERVICES

This application claims priority to the filing date of U.S. Provisional Application No. 61/157,331, which was filed on Mar. 4, 2009, the contents of which are hereby incorporated by reference. This application is also a continuation-in-part of U.S. application Ser. No. 11/514,116, which was filed on Sep. 1, 2006 now abandoned, which itself claims priority to the filing date of U.S. Provisional Application No. 60/712,808, which was filed on Sep. 1, 2005, the contents of both of which are hereby incorporated by reference.

FIELD OF THE INVENTION

The invention relates to systems and methods that are used to connect a caller to a business or to services offered by a business.

BACKGROUND OF THE INVENTION

Presently there are multiple different ways to connect a telephone call to a business. FIG. 1 illustrates some of the current architecture used to place and receive telephone calls. As shown therein, a telephone 20 or cellular telephone 30 can directly communicate with the telephone network 230. If a user wishes to call business one 120, telephone 20 or cellular telephone 30 could be used, and the user would simply dial the main telephone number for business one 120. The call would be connected through the telephone network 230.

Some users now obtain their telephone service via a data network connection. This can include users who send telephone calls through a private data network, such as a cable television service provider. This can also include users who connect telephone calls through the Internet. Either way, the user's have a data network interface 15 that is connected to a telephone 10. The data network interface 10 converts analog signals into digital data, and vice versa, so that the user's analog telephone 10 can be used to place telephone calls over the data network 100. However, those calls are ultimately delivered to the telephone network 230 for connection to most businesses.

Regardless of how the user accesses the telephone network 230, users are typically charged a fee for placing telephone calls. This could be a flat monthly fee that covers all local calls, or even all local and long distance calls. But the telephone carriers must still receive some compensation for connecting calls through the telephone network 230.

On the other hand, if a user dials a toll-free telephone number for a business, which are numbers that typically begin with 800 or 866, then the user would not be charged for placing the call. Instead, the business that has established the toll-free number will bear the cost of connecting the call. Typically, the rates charged to businesses for connecting toll-free calls are actually higher that what a user would have paid for the same call. However, it is still worthwhile to the business, because it ensures that their customers will always be able to reach them.

As illustrated in FIG. 1, some businesses, such as business one 120 and business two 122 maintain multiple separate telephone lines. This allows the business to conduct multiple simultaneous telephone calls. The business must pay to acquire and maintain multiple separate telephone numbers, one for each of the multiple lines that it needs.

Also, some businesses, such as business three 124 and business four 126 can maintain a separate connection to a data network 110, and those businesses can conduct telephone calls through the data network 110. A single data line connection could be capable of carrying multiple simultaneous telephone calls. However, if the business wants to have the ability to conduct multiple separate telephone calls through a data connection, the business will still have to pay to acquire and maintain multiple separate telephone numbers, one for each line.

In some instances, a telephone carrier could provide both a regular telephone line connection to a business, and a separate data line connection to the business through a data network 110. Business three 124 is an example of this sort of an arrangement.

There are various existing computer and telephony systems that provide voice services to users. These voice services can be speech recognition and touchtone enabled. Examples of such services include voice mail, voice activated dialing, customer care services, and the provision of access to Internet content via telephone.

One common example of a system that provides voice services is an Interactive Voice Response (IVR) system. In prior art systems, a user would typically use a telephone to call in to a central computer system which provides voice services via an IVR system. The IVR system deployed on the central computer system would then launch voice services, for instance by playing an audio clip containing a menu of choices to the user via the telephone line connection. The user could then make a selection by speaking a response. The spoken response would be received at the central computer system via the telephone line connection, and the central computer system would interpret the spoken response using speech recognition techniques. Based on the user's response, the IVR system would then continue to perform application logic to take further action. The further action could involve playing another menu of choices to the user over the telephone line, obtaining and playing information to the user, connecting the user to a third party or a live operator, or any of a wide range of other actions.

The ability to provide voice services has been quite limited by the nature of the systems that provide such services. In the known systems that provide voice services using relatively complex speech recognition processing, the voice applications are performed on high end computing devices located at a central location. Voice Application processing requires a high end centralized computer system because these systems are provisioned to support many simultaneous users.

Because complex voice application processing must be provided using a high end computer system at a central location, and because users are almost never co-located with the high end computer system, a user is almost always connected to the central computer system via a telephone call. The call could be made using a typical telephone or cell phone over the PSTN, or the call might be placed via a VoIP-type (Skype, SIP) connection. Regardless, the user must establish a dedicated, persistent voice connection to the central computer system to access the voice services.

In a typical prior art architecture for a centralized voice services platform, the speech recognition functions are performed at a central computer system. A user telephone is used to place a telephone call to the central voice services platform via a telephone network. The telephone network could be a traditional PSTN, or a VoIP based system. Either way, the user would have to establish the telephone call to the central voice service platform via a telephone carrier.

The prior art centralized voice services platforms, which depend on a telephony infrastructure for connection to users, are highly inflexible from a deployment standpoint. The configurations of hardware and software are all concentrated on a small number of high end servers. These configurations are technically complex and hard to monitor, manage, and change as business conditions dictate. Furthermore, the deployment of existing IVR system architectures, and the subsequent provisioning of users and voice applications to them, requires extensive configuration management that is often performed manually. Also, changes in the configuration or deployment of IVR services within extant IVR architectures often require a full or partial suspension of service during any reconfiguration or deployment effort.

Further, cost structures and provisioning algorithms that provision the capabilities of such a centralized voice services platform make it virtually impossible to ensure that a caller can always access the system when the system is under heavy usage. If the system were configured with such a large number of telephone line ports that all potential callers would always be connected to access contrasting types of voice services, with different and overlapping peak utilization hours, the cost of maintaining all the hardware and software elements would be prohibitive. Instead, such centralized voice services platforms are configured with a reasonable number of telephone ports that result in a cost-effective operating structure. The operator of the system must accept that callers may sometimes be refused access. Also, system users must accept that they will not receive an "always on" service.

Prior art centralized voice services platforms also tend to be "operator-centric." In other words, multiple different service providers provide call-in voice services platforms, but each service provider usually maintains their own separate platform. If the user has called in to a first company's voice services platform, he would be unable to access the voice services of a second company's platform. In order to access the second company's voice services platform, the user must terminate his call to the first company, and then place a new call to the second company's platform. Thus, obtaining access to multiple different IVR systems offered by different companies is not convenient.

In addition to the above-described drawbacks of the current architecture, the shared nature of the servers in a centralized voice services platform limits the ability of the system to provide personalized voice applications to individual users. Similarly, the architecture of prior art IVR systems limit personalization even for groups of users. Because of these factors, the prior art systems have limitations on their ability to dynamically account for individual user preferences or dynamically personalize actual voice applications on the fly. This is so because it becomes very hard for a centralized system to correlate the user with their access devices and environment, to thereby optimize a voice application that is tuned specifically for an individual user. Further, most centralized systems simply lack user-specific data.

With the prior art voice services platforms, it was difficult to develop efficient mechanisms for billing the users. Typically, the telephone carrier employed by the user would bill the user for calls made to the voice services platform. The amount of the charges could be determined in many different ways. For instance, the telephone carrier could simply bill the user a flat rate for each call to the voice services platform. Alternatively, the telephone carrier could bill the user a per-minute charge for being connected to the voice services platform. In still other methods, the voice services platform could calculate user charges and then inform the carrier about how much to bill the user. Regardless of how the charges are calculated, it would still be necessary for the telephony carrier to perform the billing, collect the money, and then pay some amount to the voice service platform.

Prior art voice services platforms also had security issues. In many instances, it was difficult to verify the identity of a caller. If the voice services platform was configured to give the user confidential information, or the ability to transfer or spend money, security becomes an important consideration.

Typically, when a call is received at the voice services platform, the only information the voice services platform has about the call is a caller ID number. Unfortunately, the caller ID number can be falsified. Thus, even that small amount of information could not be used as a reliable means of identifying the caller. For these reasons, callers attempting to access sensitive information or services were usually asked to provide identifying data that could be compared to a database of security information. While this helps, it still does not guarantee that the caller is the intended user, since the identifying data could be provided by anybody.

Some prior art voice services platforms were used to send audio messages to users via their telephones. The central voice services platform would have a pre-recorded audio message that needed to be played to multiple users. The platform would call each of the users, and once connected to a user, would play the audio message. However, when it was necessary to contact large numbers of users, it could take a considerable amount of time to place all the calls. The number of simultaneous calls that can be placed by the centralized voice services platform is obviously limited by the number telephone ports it has. Further, in some instances, the PSTN was incapable of simultaneously connecting calls on all the available line ports connected to the voice services platform. In other words, the operators found that when they were trying to make a large number of outgoing calls on substantially all of their outgoing lines, the PSTN sometimes could not simultaneously connect all of the calls to the called parties. Further, when a voice services platform is delivering audio messages in this fashion, they tie up all the telephone port capacity, which prevents users from calling in to use the service.

DETAILED DESCRIPTION OF PREFERRED EMBODIMENTS

Figure 1:
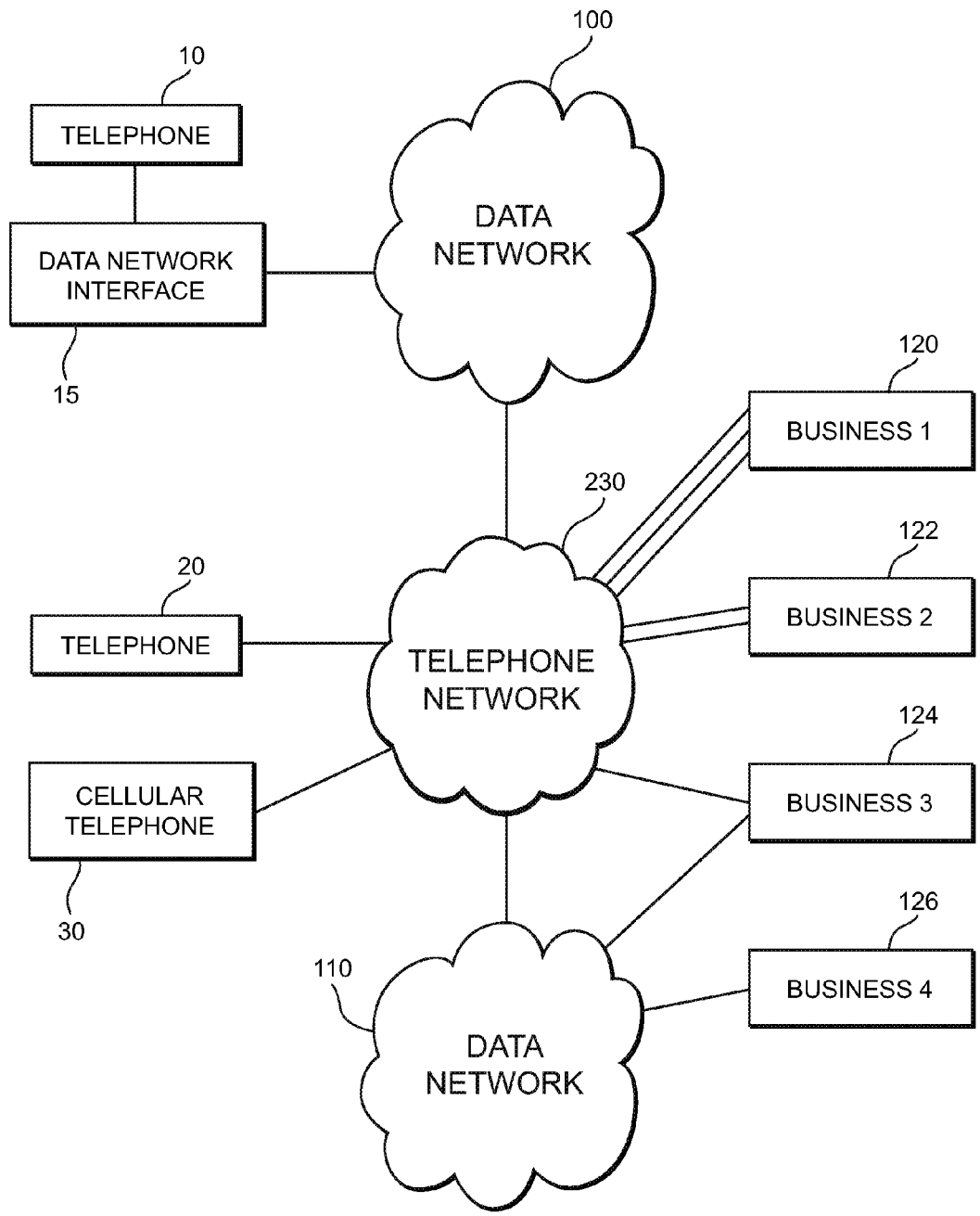
FIG. 1 illustrates elements of existing telephone connection systems that can be used to connect users to businesses.
Figure 2:
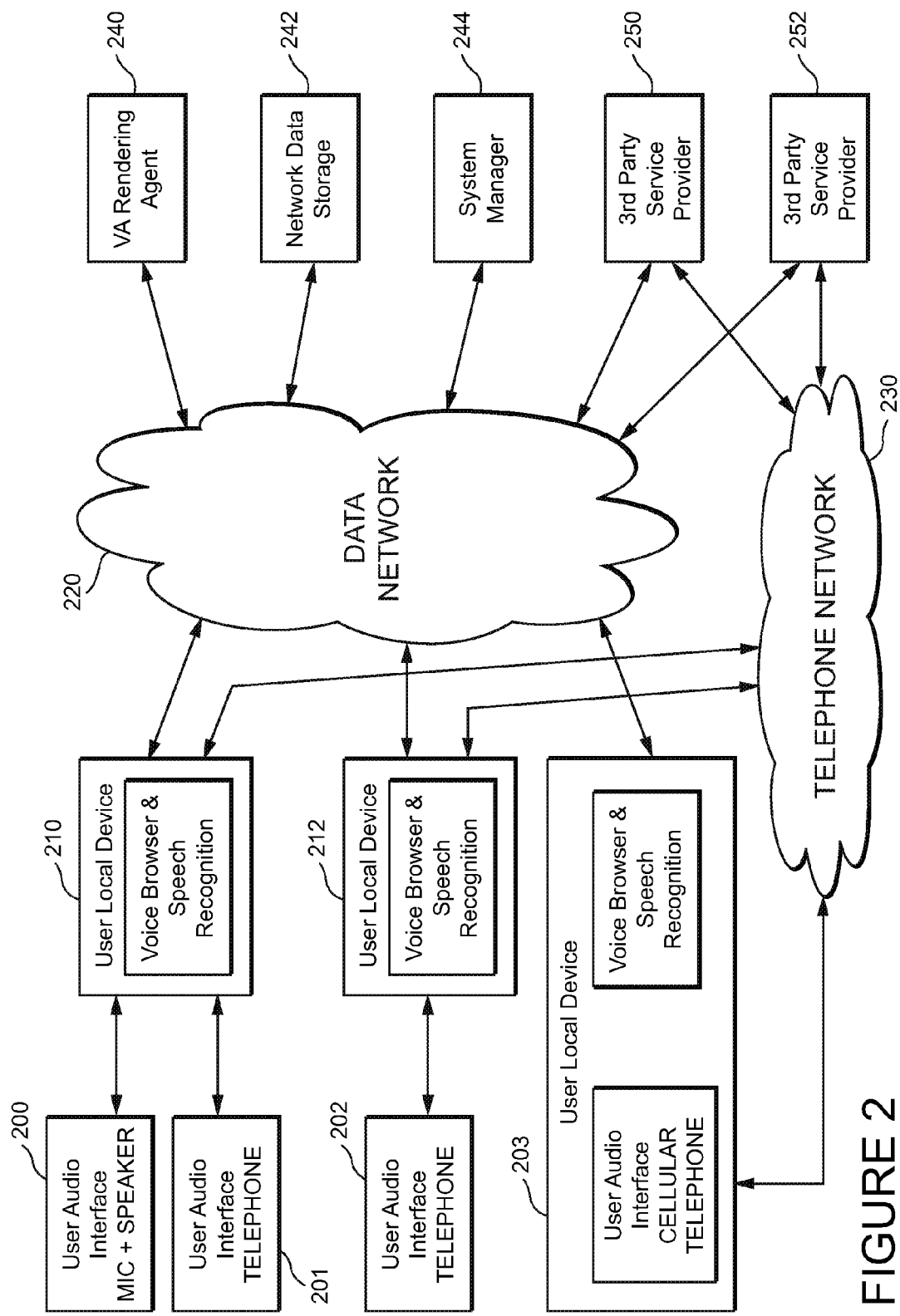
FIG. 2 illustrates elements of a system embodying the invention.

The inventors have developed new systems and methods of delivering voice-based services to users which make use of some aspects of the basic architecture illustrated in FIG. 2. A full description of the systems and methods created by the inventors is provided in U.S. patent application Ser. No. 11/514,116, which was filed on Sep. 1, 2006.

The systems and methods created by the inventors are intended to provide users with speech and touch tone enabled Voice Applications for accessing various services and for performing various functions. In this respect, the systems, devices and methods embodying the invention serve some of the same functions as prior art centralized voice services platforms. The systems and methods can also be used to provide the same type of call forwarding discussed above, but at a lower cost, and with greater flexibility. In addition, the systems and methods created by the inventors make it possible to provide users with a whole host of additional call handling and call notification functions that would have been impossible with prior systems.

Unlike the prior art voice services platforms, systems and methods embodying the invention utilize a highly distributed processing architecture to deliver the services. As will be explained below, the underlying architecture and the distributed nature of systems and methods embodying the invention allow the inventive systems to provide the same services as the prior art systems, but with better performance, at a significantly reduced cost, and with far fewer limitations. In addition, systems and methods embodying the invention avoid or solve many of the drawbacks of the prior systems. Further, because of the way systems and methods embodying the invention operate, they can provide new and additional services that could never have been provided by the prior art systems. Systems and methods embodying the invention also allow for much better personalization of delivered services, and they allow existing services to be upgraded, improved, or further personalized much more easily than was possible with the prior art systems.

Systems and methods embodying the invention are intended to deliver or provide Voice Applications (hereinafter, "VAs") for a user. Before beginning a discussion of systems and methods that embody the invention, we should start by discussing what a VA is, and what a VA can do for a user. Unfortunately, this is somewhat difficult, because VAs can take a wide variety of different forms, and can accomplish a wide variety of different tasks.

A VA provides a user with the ability to use their natural voice, touch tone sequences or other forms of user input, to access and/or control an application, to obtain information, to perform a certain function, or to accomplish other tasks. Although the majority of the following description assumes that a user will interact with a system embodying the invention, at least in part, via speech, other forms of user interaction fall within the scope and spirit of the invention. For instance, developing technologies that allow a user to make selections from visual menus via hand or eye movements could also for the basis of a user interaction protocol. Likewise, developing technologies that are able to sense a user's brainwave patterns could form the basis of a user interaction protocol. Thus, systems and methods embodying the invention are not limited to speech-based user interfaces.

A VA could be specifically developed to utilize the benefits of speech recognition-based input processing. For instance, a VA could be developed to access, play and manipulate voice mail via speech commands. Alternatively, a VA could act as an extension or an enhancement of traditional GUI-like applications to allow the traditional applications to be accessed and/or controlled by speech commands. For instance, a VA could allow the user to call up specific e-mail messages on a display via spoken commands, and the user would then read the e-mail messages on the display.

In some instances, a VA could act like one of the interactive voice response systems that are accessible to users on prior art centralized voice services platforms. A VA could act in exactly the same way as a prior art IVR system to allow a user to obtain information or accomplish various functions using a speech enabled interface. However, because of the advantages of the new architecture, a system embodying the invention can perform voice applications that would have been impossible to perform on prior art centralized voice services platforms. Other VAs could perform a wide variety of other tasks. In most instances, the user would be able to accomplish functions or obtain information by simply speaking voice commands.

With the above general description of a Voice Application (VA) as background, we will now provide an overview of systems and methods embodying the invention. The following overview will make reference to FIG. 2, which depicts a high-level diagram of how a system embodying the invention would be organized.

As shown in FIG. 2, preferred embodiments of the invention would make use of an optional telephone network 230 and a data network 220. The telephone network 230 could be a traditional PSTN, a VoIP system, a peer-to-peer telephone network, a cellular telephone network, or any other network that allows a user to place and receive telephone calls. The data network 220 could be the Internet, or possibly a private or internal local area network or intranet.

In some instances, users would only be physically coupled to a data network, such as the Internet. In this case, the user's on-site equipment could enable them to place VoIP telephone calls via the data network. Such VoIP telephone calls might make use of the PSTN, or the entire call might be handled over the data network. Regardless, in preferred embodiments, the user would be capable of simultaneously maintaining a telephone connection and sending and receiving data.

Systems embodying the invention, as shown in FIG. 2, will be referred to as having a Distributed Voice Application Execution System Architecture (hereinafter, a "DVAESA"). Thus, the term DVAESA refers to a system and method of providing voice application services in a distributed fashion, over a network, to a customer device. Such a system is closely managed by a centralized system to, among other things, ensure optimum performance, availability and usability. In some of the descriptions which follow, there are references to "DVAES-enabled" equipment or local devices/device. This means equipment and/or software which is configured to act as a component of a DVAESA embodying the invention.

A user would utilize an audio interface device to access the DVAESA. In the embodiment shown in FIG. 2, a first user's audio interface 200 comprises a microphone and speaker. A second user audio interface 201 comprises a telephone. The telephone 201 is also connected to the same user local device 210 as the first user audio interface. A third user's audio interface 202 could also comprise a telephone. This telephone 202 could be a regular wired telephone, a wireless telephone or even a cellular telephone. The DVAES-enabled devices may support multiple audio interface devices, and the multiple devices could all be of the same type, or multiple different types of user audio interfaces could all be connected to the same local device.

Each user would also make use of a local DVAES-enabled device that would act to deliver or provide VAs to the user through the user's audio interface. The local DVAES-enabled devices would include a voice browser capable of performing voice applications that have been distributed over the network, some of which may have speech recognition functions. Such voice applications could be predelivered to the local DVAES-enabled device, or the voice applications could be fetched in real time. Such voice applications are personalized to the user and optimized for the device. In the embodiment shown in FIG. 2, each of the user local devices 210, 212, 203 are coupled to the respective user audio interfaces, and to the data network.

In some embodiments of the invention, a user audio device and a DVAES-enabled device could be integrated into a single electronic device. For instance, a PDA with cell phone capability could also incorporate all of the hardware and software elements necessary for the device to also act as the DVAES-enabled equipment. Thus, a single user device could function as both the DVAES-enabled equipment that communicates with the network, and as the user audio interface. The user local device 203 shown in FIG. 2 is intended to illustrate this sort of an embodiment.

Also, in FIG. 2, various lines connect each of the individual elements. These lines are only intended to represent a functional connection between the two devices. These lines could represent hard-wired connections, wireless connections, infrared communications, or any other communications medium that allows the devices to interact. In some instances the connections could be continuous, and in others the connection could be intermittent. For instance, an audio interface and a user local device could be located within a user's vehicle. In such a case, the local device within the vehicle might only be connected to the network through a cellular telephone network or through another type of wireless network when such connectivity is required to provide a user with services. In a similar embodiment, the local device in the user's vehicle might only link up to the network when the vehicle is parked at the user's home, or some other location, where a wireless connection can be implemented.

Also, the user audio interface 202 shown in FIG. 2 could be a cell phone that is capable of interacting with the normal cellular telephone network. However, the cellular telephone might also be capable of interacting with the user local device 212 via a wired or wireless connection. Further, the cellular telephone 202 might be configured such that it acts like a regular cellular telephone when the user is away from home (and is not connected to the local device 212). But the cellular telephone might switch to a different operating mode when it is connected to the local device 212 (when the user is at home), such that all incoming calls to that cell phone are initially received and processed by the local device 212. The DVAESA also would include some network-based elements. As shown in FIG. 2, the network-based elements could include a VA rendering agent 240, a network storage device 242 and a system manager 244. Each of these network-based elements would be connected to the data network.

Also, although they would not technically be considered a part of the DVAESA, there might also be some third party service providers 250, 252 which are also connected to the data network, and/or to the telephone network. As explained below, the VAs may enable the users to interact with such third party service providers via the data and telephone networks.

When a DVAESA as shown in FIG. 2 is configured, VAs would be "rendered" by the VA rendering agent 240, the output of the rendering process would be rendered VAs. These rendered VAs may be stored on the Network Storage Device 242, or be distributed or delivered to a DVAES-enabled Device. "Rendering" refers to a process in which a generic VA is personalized for a particular user and/or one or more particular DVAES-Devices to generate Rendered VAs. The system manager 244 could instruct the VA rendering agent 240 to render a VA for a particular user, or such rendering request could originate from the DVAES-enabled Device. The DVAESA network data storage element 242 could be used to store generic VA, rendered VAs, or a wide variety of other data and resources (e.g. audio files, grammars etc).

As mentioned above, the VA rendering agent would personalize a generic VA during the rendering process. This could take into account personal traits of the individual user, information about the configuration of the local device(s), or a wide variety of other things, as will be explained in more detail below. The information used to personalize a VA during the rendering process could be provided to the VA rendering agent at the time it is instructed to render the VA, or the VA rendering agent could access the information from various data storage locations available via the data network.

The user's local devices would typically be inexpensive computing devices that are capable of running a voice browser and performing speech recognition capable rendered VAs. Such devices are often referred to as embedded multimedia terminal adaptors (EMTAs) and optical embedded multimedia terminal adaptors (OEMTAs). In many instances, the local device would be physically present at the user's location, such as a home or office. In other instances, however, the local device could be a virtual device that is capable of interacting with one or more user audio interfaces. As mentioned above, the local devices may also store rendered VAs, and then act to perform the rendered VAs to the user's audio interface. The user local device could be a customer premise device that is also used for some other function. For instance, the local device could be a cable modem or set-top box that is also used to connect a television to a cable network, however, the device would also be configured to perform VAs for the user via the user's audio interface.

In one simple embodiment of the invention, a local embedded device 212 would be linked to a user's telephone 202. The local device 212 would also be linked to the Internet 220 via a medium to high speed connection, and possibly to the telephone network 230. The user could speak commands into the telephone 202, and those spoken commands would be processed by the local device 212 to determine what the user is requesting.

The processing and interpretation of a user's spoken commands could be entirely accomplished on the local device 212. In other embodiments, the local device might need to consult a speech recognition engine on a remote device, via the data network, to properly interpret a portion of a spoken command that cannot be understood or interpreted by the local device. In still other embodiments, the user's spoken commands could be entirely processed and interpreted by a remote speech recognition engine. For instance, a recording of the user's spoken commands could be relayed to a remote speech recognition engine, and the speech recognition engine would then process the spoken commands and send data back the local device indicating what the user is commanding. Even this process could be accomplished in real time such that the user is unaware that the interpretation of his spoken commands is being accomplished on a remote device.

Because of the greater sophistication that is possible with a system embodying the invention, if the local device does not understand something, it can often ask another question of the user to clarify the situation. In addition, the local device can offer greatly expanded vocabulary and speech processing by enlisting the assistance of network agents. For all these reasons, a consumer electronic device that is coupled into the DVAES architecture can provide a much more sophisticated voice application than prior art devices which were not connected to a network.

Once the spoken command has been interpreted, in some instances, the local device 212 may be able to satisfy the user's request. In other instances, the local device 212 might need to request information from a VA Rendering Agent 240 to satisfy the user's request. If that is the case, the local device 212 would send a query over the data network 220 to the VA Rendering Agent 240 for some type of content. The requested content would be returned to the local device 212, and the local device 212 would then provide the content to the user via the user's telephone 202. In other instances, the local device may be able to query other network-connected elements which are not a part of the DVAES Architecture, and those other elements would return the requested data to the local device so that the data could be delivered to the user via the audio interface.

Depending on the VA being performed, the functions that are performed in response to a user request may not involve playing audio information to the user via the user's audio interface. For instance, the local device could be performing a VA relating to accessing e-mail. In this instance, a user's spoken request could cause the local device to act in a manner that ultimately results in the user's e-mail messages being shown on a display screen. In this instance, although the user makes use of a speech-based interface to obtain information and/or perform a certain function, the ultimate result is not the playback of audio, but rather display of an e-mail message.

The end result of a user request could take many other forms, such as the local device causing a certain action to be taken. For instance, the user might speak a request that causes the user's home air conditioning system to be turned on. The list of possible actions that could be enabled by the local device is virtually endless. But the point is that the local device is able to provide a speech-enabled interface to the user, via the audio interface, to allow the user to accomplish a task.

In another simple embodiment, the user might pick up his telephone 202 and speak a request to be connected to another person's telephone. A voice application performed on the local device would interpret the user's spoken request. This could be done on the local device, or the voice application could utilize remote assets to accomplish the speech recognition. Some or all of the speech recognition could occur on the remote assets. The voice application would then take steps to place a telephone call to the person identified by the user. This might involve connecting the user via the telephone network 230, or connecting the user to the requested party via a VoIP call placed over the data network 220.

It is also worth noting that when a user is connected to the DVAES architecture, the VAs provided by the system can completely replace the dial tone that people have come to associate with their telephones. The moment that a user picks up his telephone, he will be launched directly into a voice application that is provided by the system. In the past, this may have been technically possible, but it was always accomplished by making use of the traditional phone system. For instance, one of the prior art centralized voice services platforms would have been capable of ensuring that the moment a user lifts his telephone, that user was immediately connected to a central voice services platform that would guide the remainder of the user's experience. But this was always accomplished by establishing an immediate voice channel between the user's telephone and the central voice services platform. And to accomplish that, it was necessary to involve the telephone carrier that would link the user's telephone to the voice services platform. In contrast, with the DVAES architecture, one no longer needs to make any use of the telephone carriers to provide this sort of a service. And, as noted above, the user can still be easily connected to the regular telephone network if he needs to place a call.

In the same vein, in the past, whenever a user wanted to have a third party service answer his telephone calls, as in traditional voice mail systems, it was necessary to involve the carrier in routing such calls to a third party service. Now, when a call is made to the user's telephone, the DVAES architecture makes it possible to answer the call, and take voice mail recordings, without any further involvement of the carrier. Here again, the DVAES architecture makes it possible to eliminate the services of the telephone carrier.

In both the examples outlined above, the involvement of the carrier necessarily increased the cost of providing the voice services. Because the carrier can be eliminated, the same sorts of voice services can be provided to a user for a significantly reduced cost. And, as explained below, the services can be delivered with greater performance and with new and better features.

In some embodiments, rendered Voice Application processing is performed on the local device and the associated the voice recognition functions may also be performed on the local device. For this reason, there is no need to establish a dedicated duplex audio link with a remote high end computer. Also, even in those instances where a portion of the voice application processing is performed by a remote device, and/or where processing and interpretation of spoken commands is processed by a remote device, the communications necessary to accomplish these actions can be made via data packets that traverse a data network. Thus, here again, there is no need to establish a dedicated duplex audio link with a remote high end computer to provide the requested services.

Also, because the local embedded device is coupled to a data network such as the Internet, it can rapidly obtain Rendered Voice Applications and associated data from various remote sources in order to satisfy user requests. For these reasons, the simple embedded local device allows one to provide the user with speech recognition enabled Voice Applications without the need to create and maintain a high end speech service platform with multiple telephone line access equipment.

As noted above, the local device could also use the network to obtain access to various other physical elements to effect certain physical actions, such as with the home air conditioner example given above. In this context, the other physical elements could be connected to the network, or the local device could have a local connection to physical elements that are also located on the user's premises. For instance, the local device could have a hard-wired or wireless connection to many different elements in a user's home or office that allow the local device to control operations of the physical elements. In other embodiments, the piece of physical equipment could act as the local device itself.

One obvious advantage of a DVAESA over prior art voice service platforms is that a DVAESA embodying the invention can provide VAs to users without any involvement of a PSTN, VoIP, Peer-Peer carrier. The instant the user picks up his telephone handset, he will be interacting with the DVAESA, not the telephone system. A large number of VAs could be accomplished without ever involving a telephone carrier as the Voice Application is delivered and provided on the local device. Because the user can directly access the DVAESA without making a telephone call, the operator of the DVAESA will not need to pay a telephone carrier in order to provide the service to users.

As noted above, if the user wishes to place a telephone call, this can be easily accomplished. But there is no need to use a telephone carrier as an intermediary between the user and the DVAESA. This has multiple positive benefits.

Also, for a multitude of different reasons, a DVAESA will be less expensive to deploy and operate than the prior art central voice services platforms. To begin with, because the DVAESA can provide services to users without a telephone link, the DVAESA operator no longer need to purchase and maintain multiple telephone line ports into the system.

Also, the types of equipment used by the DVAESA are inherently less expensive to deploy and manage than the equipment used in a central voice services platform. A DVAESA embodying the invention uses relatively inexpensive network appliances that can be located anywhere, and that can be deliberately distributed over a wide area to enhance reliability of the system. In contrast, a central voice services platform requires expensive and specialized telecom equipment like telecom switches and IVR servers. The central voice services platforms also require more intensive management and provisioning than a DVAESA, and this management must be provided by highly skilled personnel as most of the equipment used is highly proprietary in nature. In contrast, the DVAESA is largely managed by an automated management system.

A prior art central voice services platform is only able to simultaneously service a limited number of users As noted above, in the prior art central voice services platforms, a dedicated voice link, via a telephone call, is maintained for each connected user. Once all lines are connected to users, no additional users are able to access the system. Hence the maximum number of simultaneous users that can be supported at any given time is equal to the lesser of the number of access lines or the number of associated telephony/IVR ports an operator maintains.

In contrast, a DVAESA embodying the invention has a very high limit on the number of users that can be simultaneously serviced. In a DVAESA embodying the invention, the moment a customer picks up his telephone he will be connected to the system. Thus, a DVAESA embodying the invention is "always on." Also, much of the interactions between the user and the system are handled directly by the local device on the customer premises. If the local device cannot immediately service a user request, and additional information is needed, the local device may make a synchronous or asynchronous request over the Internet. Typically, the information will be quite rapidly returned and played to the user. Thus, even if there is a small delay, the user is nevertheless still connected the voice services system.

With the DVAESA model, the same number of server assets can handle data requests from a much larger number of users as compared to the prior art central voice services platform. This is also another reason why a DVAESA is less expensive to deploy and maintain than a prior art central voice services platform.

In addition to being easier and less expensive to deploy and maintain, a DVAESA embodying the invention can also scale up much more quickly and at a lower cost as new users are added to the system. To begin with, because the DVAESA does not require dedicated telephone lines to operate, there is no cost associated with adding additional telephone ports to the system to accommodate additional users. Likewise, as new users are added, there are no new additional telecommunications expenses for more connect time or access. In addition, for the reasons noted above, the equipment used by the system is far less expensive than the equipment used in a central voice services platform to service the same number of users. Thus, adding any new equipment and users is less expensive for a DVAESA. Moreover, because it requires less equipment to service the same number of users in a DVAESA, there is much less equipment to purchase and maintain for each additional 1000 users.

A DVAESA embodying the invention is inherently more reliable than a prior art central voice services platform. Because the assets of a prior art system are typically located in a few physical locations, and are tied to physical phone lines, power outages and other physical problems are more likely to prevent users from being able to use the system. In contrast, a DVAESA can have its equipment distributed over a much wider area to reduce these problems. The points of a failure of a DVAESA can be highly localized and it is very cost effective to replicate DVAESA equipment.

Moreover, the underlying nature of the DVAESA makes it easy to connect multiple redundant servers to the network, so than in the event one or more assets fail, redundant assets can step in to take over the functions of the failed equipment. This was difficult to do in prior art central voice services platforms, and even when it was possible to provide redundant capabilities, the cost of providing the redundant equipment was much higher than with a DVAESA.

In addition, a prior art central voice service platform needs a telephone carrier to provide access to the users. If the telephone carrier has a service outage, the prior art system cannot function. In contrast, a DVAESA does not have any reliance on a telephone carrier.

The only network required to provide the DVAESA is the data network like the Internet. The user in most cases will not experience an interruption to access to the voice services of a DVAESA, even if there is an outage that disables the local device's access to the Internet. The local device could potentially perform some of the applications without connecting to the network. This indicates that for some Voice Applications in the DVAESA, it may be sufficient for the local device to have intermittent access to the Internet.

The architecture of a DVAESA makes it inherently able to deliver certain types of VAs with vastly improved performance. To use one concrete example, as noted above, when a central voice services application is attempting to deliver the same audio message to large number of users, the central voice services application must place a telephone call to each user, using a dedicated phone line, and deliver the message. Because the central voice services platform only has a limited number of outgoing lines, it can take a significant amount of time to place all those calls.

In contrast, in a DVAESA embodying the invention, it is not necessary to place any telephone calls to deliver the audio message to users. Instead, a server which is part of the system can push instructions to play the audio message, and the message itself (the message could be stored in advance of when the event to deliver the message occurs), to each of the local devices, and the local devices can then play the messages for each individual user. In variations on this theme, the server might only send the instruction to play the message, along with a reference to where a copy of the audio message is stored. Each local device could then download a copy of the message from the indicated location and play it for the user. Regardless, it would be possible for the DVAESA architecture to deliver the audio message to all the users in a small fraction of the time that it would take the prior art central voice services platform to accomplish the job.

Moreover, as also explained above, while the prior art central voice services platform is making calls to deliver audio messages to a plurality of users, it is tying up it's phone lines, and thus it's capacity to allow users to call in for services. In contrast, when a DVAESA is delivering audio messages to a plurality of users, the users are still able to access their voice services for other purposes.

A DVAESA embodying the invention also makes it possible to deliver many new voice applications and services that could never have been provided by the prior art central voice services platform. In most cases, it is the underlying differences in the architecture of a DVAESA embodying the invention, as compared to the prior art voice services platforms, which make these new services possible.

For example, a user could configure a voice application to run constantly in the background on a local device, and then take a certain action upon the occurrence of a specified event. So, for instance, the user could set up a voice application to break into an existing telephone conversation to notify him if a particular stock's trading price crosses a threshold. In this scenario, the voice application would periodically check the stock price. If the threshold is crossed, the voice application could cause any existing telephone call that the user is on to be temporarily suspended, and the voice application would then play the notification. The voice application could then return the caller to his call. This sort of a voice application would also be very complicated to provide under the prior art central voice services platform.

The graceful integration of advertising messages is another example of how a DVAESA embodying the invention can provide services that were impossible to provide with prior art central voice service platforms. As an example, if the user lifted the telephone and spoke a command that asked for options about ordering a pizza, the system could respond with a prompt that said, "to be connected to Pizza Shop A, say one; to be connected to Pizza Shop B, say two. By the way, Pizza Shop A is having a two for one special today." Thus, the advertising message could be gracefully incorporated into the played response. Also, the advertising message would be highly context relevant, which would make it more interesting to advertisers. Thus, advertising revenue could be collected by the operator of the DVAESA system.

A DVAESA embodying the invention could also be used to rapidly collect data from a very large number of users in ways that would have been impossible with prior art central voice services platforms. In this example, assume that a television program is currently airing, and during the program, viewers are invited to vote on a particular issue. In prior art systems, the users would typically place a telephone call to a central voice services platform and make a voice vote. However, as noted earlier, prior art voice services platforms are only able to talk to a limited number of callers at the same time because the callers must be connected by dedicated phone lines.

In a DVAESA embodying the invention, the user might be able to pick up the phone and say, "I want to vote on issue X." The system would already know that viewers of a television program had been invited to place a vote, so the system could immediately take the user's voice vote. The system could also tabulate the votes from all users making similar voice votes, and then provide the voting results to the television show producers in real time. Because so little actual information is being exchanged, and the exchanges are made over the Internet, thousands, and perhaps even millions of votes could be received and tabulated in a very short period of time. This would have been impossible with prior art central voice services platforms. Furthermore, a DVAES can distribute a fully featured voice application that not only plays the message, but further solicits feedback from the user, optionally tailors the interaction with the user, and may record any user feedback or responses. Furthermore, if the producers of the television show were willing to pay a fee to the operator of the DVAESA, the system could be configured such that as soon as viewers are invited to cast a vote, and for the duration of the voting period, anytime that a user of the DVAESA picks up his telephone to access the system, the system would first respond with the question, "would you like to vote on issue X?" This would be yet another way to derive advertising or promotional revenue from the DVAESA.

There are countless other ways to exploit the architecture of a DVAESA embodying the invention to accomplish tasks and to perform VAs that would have been impossible using the prior art central voice services platforms. The above examples are merely illustrative.

A DVAESA embodying the invention also allows for much greater personalization of the voice applications themselves than was possible with prior art central voice services platforms. In addition, the architecture allows the users themselves to control many aspects of this personalization.

To begin with, as explained above, in a DVAESA a VA Rendering Agent is responsible for customizing voice applications, and then delivering the customized voice applications to the local devices at the customer sites. Thus, the basic architecture assumes that each user will receive and run personalized versions of voice applications. This difference alone makes it much, much easier to provide users with personalized voice applications than prior art central voice services platforms.

The VA Rendering Agent could personalize a voice application to take into account many different things. For instance, the VA Rendering Agent could access a database of user personal information to ensure that a VA takes into account things like the user's name, his sex, age, home city, language and a variety of other personal information. The VA Rendering Agent could also access information about the capabilities of the local device at the customer's location that will be providing the VA, and possibly also the type of audio interface that the user has connected to the local device. The VA Rendering Agent could then ensure that the customized version of the VA that is provided to the user's local device is able to seamlessly and efficiently run on the local hardware and software. The VA Rendering Agent could also take into account user preferences that the user himself has specified. For instance, the VA could be customized to play audio prompts with a certain type of voice specified by the user.

Another important way that VAs could be personalized is by having the DVAESA track how the user is interacting with the system. For Example if the user has a certain type of accent or has a certain pattern of use or has a certain type of background noise, the VA Rendering Agent could take these factors into account on an on going basis to ensure that the customized VAs that are sent to the user are tuned to the user. The system might also note that whenever a three choice menu is played to the user, the user always makes the third selection. In that case, the VA Rendering Agent might be directed to re-render the VA so that the VA presents the third option first, instead of last.

There are any number of other ways that VA's could be customized or personalized to take into account aspects of individual users. And these customizations are easily and automatically accomplished by configuring the VA Rendering Agents to automatically incorporate these personalizations when delivering VAs for users. Because the DVAESA is configured so that each individual user may have his own versions of VAs, preferably stored on his local devices cache, this personalization is not difficult to accomplish. Such personalizations are complimented by the continuous analytics process that is being performed on DVAESA data. This data is collected during the on going functioning of the system and is provided by all DVAESA components. After collection, the data is analyzed, and the results of the analysis are used to continuously tune and improve the functioning of the system on an individual user-by-user basis.

A DVAESA also allows for better, more direct billing for delivery or usage of services. Because there is no telephone company acting as an intermediary, the operator of a DVAESA can directly bill users for use of the system. Also, the way the system is configured, the user can select individual services, which are then provided to him by rendering a VA and loading it on the user's local equipment. Thus, the user can tailor his services to his liking, and the operator of the DVAESA has an easy time tracking what services the user has. For all these reasons, it is much easier to bill the user for use of the services.

Another benefit that flows from the DVAESA model is the ability of a user to access services provided from two different DVAESA operators on a single piece of local equipment. As will be explained in more detail below, a first DVAESA operator could load a first set of VAs onto the user's local equipment, and a second DVAESA operator could load a second set of VAs onto the same piece of operator equipment. For instance, the first DVAESA operator could be one that provides the user with services related to his business, and the second DVAESA operator could be one that provides the user with services relating to the user's personal life. There is no inherent conflict in both having two different sets of VAs loaded onto the local device. And each DVAESA operator can thereafter maintain and update their respective VAs. Likewise, the user can cause both sets of VAs to be loaded on a first device at his office, and a second device at his home. This allows the user to easily and immediately access services from either operator, regardless of his present location. This sort of flexibility would also have been completely impossible in prior art central voice services platforms.

A DVAESA can also provide enhanced security measures compared to prior art central voice services platforms. For instance, because the DVAESA is interacting with the user via spoken commands, it would be possible to verify the identity of a user via a voice print comparison.

In addition, the individual local devices can be identified with unique ID numbers, and credentials verifying the identity and permissions of users and devices can all be created and stored in various locations on the system. By using these unique identification numbers and certification files, one can ensure that only authorized users can access sensitive information or perform sensitive functions.

Figure 3:
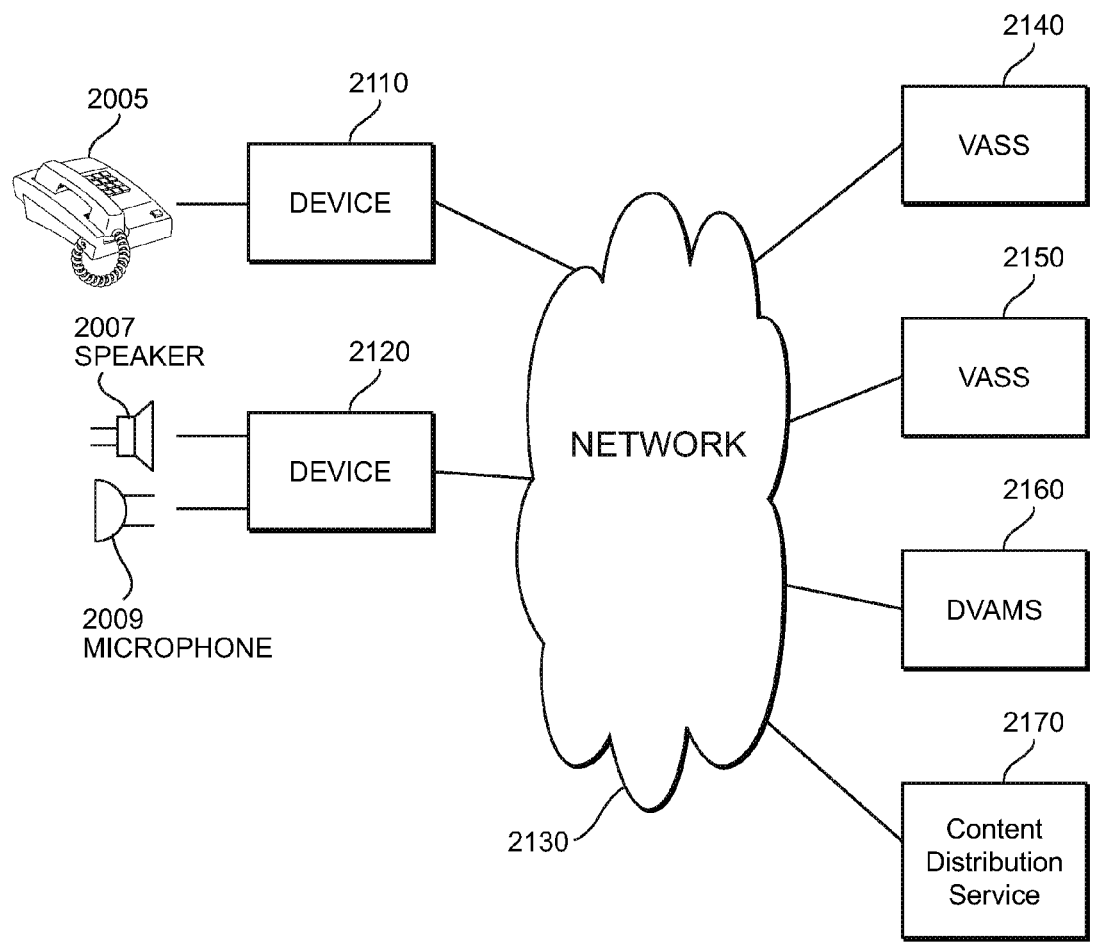
FIG. 3 illustrates elements of another system embodying the invention.

Having now provided a broad overview of the how a system embodying the invention would operate, and the inherent advantages of a DVAESA system as compared to prior art systems, we will now turn to a slightly more specific description of the main elements of a DVAESA embodying the invention, with reference to FIG. 3. In doing so, we will introduce some new definitions and terminology which will be used throughout the remainder of the detailed description.

A DVAESA would be configured to deploy and utilize one or more Voice Application Agents (hereinafter "VAAs") which themselves enable the delivery or performance of a VA through a local device that would typically be located in a user's home or office. In some instances, a VAA may be wholly resident on a single local device. In other instances, the functions of a VAA may be split between multiple portions of the overall system. Likewise, a single local device may only host one VAA. Alternatively, a single local device may host multiple VAAs. These variations, and the flexibility they provide, will be discussed in more detail below. The important concept is that a VAA is the agent that is responsible for delivering or performing a VA for the user.

The network 2130 shown in FIG. 3 could be the Internet. However, in some instances, the network 2130 could be a public or private local network, a WAN, or a Local Area Network. In most instances, however, the network 2130 will be the Internet. Also, the network 2130 could also comprise portions of the PSTN, existing cellular telephone networks, cable television networks, satellite networks, or any other system that allows data to be communicated between connected assets.

Figure 4:
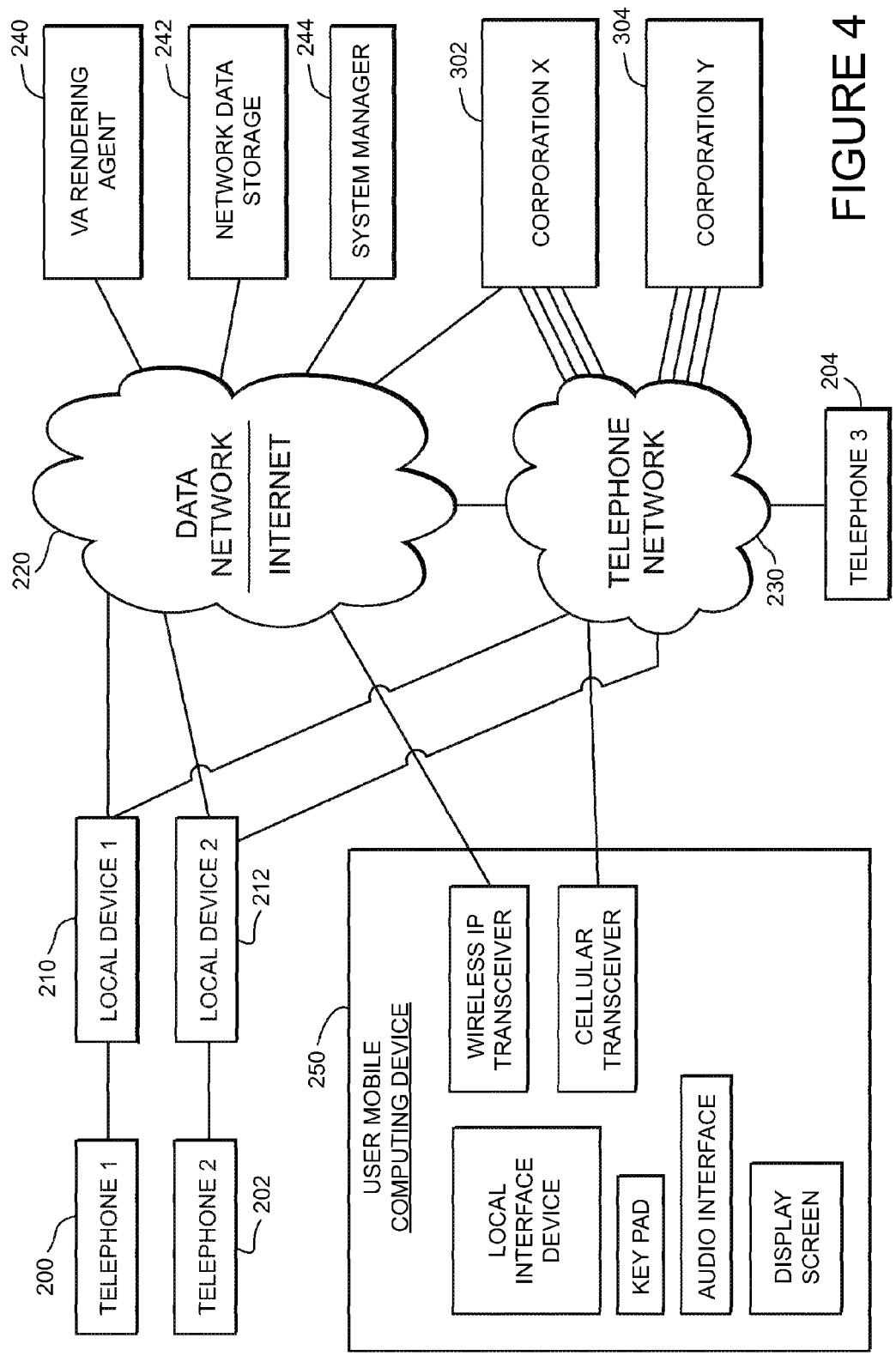
FIG. 4 illustrates elements of another system embodying the invention.

The devices 2110 and 2120 appearing in FIG. 3 would be the local embedded devices that are typically located at a user's home or office. As shown in FIG. 4, in some instances, a local device 2110 could simply be connected to the user's existing telephone. In other instances, the local device could be coupled to a speaker 2007 and microphone 2009 so that the local device can play audio to the user, and receive spoken commands from the user. In still other embodiments, the local device may be a standalone telephone, or be included as part of a cellular telephone, a computing device with wireless access, a PDA that incorporates a cellular telephone, or some other type of mobile device that has access to a data network.

A system embodying the invention also includes components that deliver voice applications, data and other forms of content to the local devices. These components could include one or more Voice Application Services Systems (hereinafter VASSs). In the system depicted in FIG. 3, there are two VASSs 2140 and 2150. A system embodying the invention could have only a single VASS, or could have multiple VASSs.

One of the primary functions of a VASS is to render VAs and to then provide VA components to VAAs. In preferred embodiments, a VASS would provide customized VAs components to VAAs, upon demand, so that the VAAs can perform the customized VAs components for the user. The VASSs could personalize generic VAs based on known individual user characteristics, characteristics of the environment in which the VA components will be performed, information about how a user has previously interacted with the system, and a wide variety factors. The distribution of the personalized VA components to the VAAs could also be accomplished in multiple different ways.

A system embodying the invention may also include one or more Content Distribution Services (hereinafter a "CDSs"). This is an optional component that basically serves as a data storage and content distribution facility. If a system embodying the invention includes one or more CDSs, the CDSs would typically provide network-based caching of content, such as VA components, configurations, DVAESA components, and other shared or frequently used content. The CDSs would be deployed throughout the network to help reduce network traffic latency, which becomes particularly noticeable in any speech interaction system.

The DVAESA components could broadly be identified as a Distributed Voice Application Execution System (hereinafter, a "DVAES"), and a Distributed Voice Application Management System (hereinafter, a "DVAMS") A DVAES comprises at least a VASS, one or more VAAs, and the underlying hardware and software platforms.

The system shown in FIG. 3 includes a DVAMS. The DVAMS handles a wide variety of management functions which include registering users, specific items of hardware and other DVAES components, directing the rendering, caching, distribution and updating of VAs components, organizing and optimizing the performance of system assets, and multiple other functions. The DVAMS may also include an interface that allows an individual user to customize how the system will interact with him, and what products and services the user wishes to use. The DVAMS would also provide an interface that allows system operators to manually control various aspects of the system.

This brings us back to a more detailed description of how the system architecture described above could be used to connect users to businesses at a reduced cost, and with greater ease and flexibility. FIG. 4 illustrates a system embodying the invention that can be used for this purpose.

As mentioned above, some businesses are already connected to a data network, and they are already configured to conduct telephone calls over a data network connection. Typically, this is accomplished using a gateway located at the business, the gateway being coupled to the Internet, or a private data network. Telephone calls are connected to the business by establishing a VOIP call through the business's gateway.

Using the architecture illustrated in FIG. 4, it is possible to completely eliminate the involvement of a telephone carrier, and the telephone network, in establishing a telephone call between a user and a business. In other instances, it is possible to at least connect users to a business entirely through the data network, without using any of the traditional PSTN architecture elements. In both of these instances, it may be possible to reduce the cost of connecting callers to the business.

For instance, in the system illustrated in FIG. 4, telephone one 200 is connected to the data network 220 through a local device 210. If the user wishes to place a telephone call with telephone one 200, the user could dial a telephone number on telephone one 200, and a voice application performed on the local device 210 would configure and conduct an outbound telephone call to the dialed number. As also mentioned above, the speech recognition functions of the system would also allow the user to simply lift the handset of telephone one 200 and speak a command to be connected to a particular spoken number. The system would be able to recognize the command, and the numbers spoken by the user, and the same call could be placed. Further, it would be possible for the user to speak a command to be connected to a particular party. In this instance, the voice application performed on the local device 210 would be capable of interpreting the user's spoken request, of determining the telephone number of desired party, and of then placing the call to that party.

If the user is attempting to reach a telephone that is connected only through the telephone network 230, such as telephone three 204, the telephone call would be routed from the data network 220 into the telephone network 230, and then to the called party at telephone three 204. Likewise, if the user is attempting to reach corporation Y, the call would be routed into the data network 220, then into the telephone network 230, and then into corporation Y 304.

If the user is attempting to reach corporation X 302, then the call could be completed to corporation X in two different ways. First, the call could be completed through the telephone network 230 as described above. Alternatively, call could completely bypass the traditional elements of the PSTN in the telephone network 230, and the call could be connected to corporation X through only the data network 220.

It would be necessary for the system to know the IP address being used by a gateway that Corporation X maintains to receive calls from the data network 220. This information could be obtained in multiple different ways. In some instances, there may be a publically accessible directory that is accessible via that data network, and which cross-references the businesses and the current IP addresses that could be used to complete calls to those businesses. In other instances, the businesses themselves might provide this information to the system. Because VOIP calls over the data network could be completed for a lower cost than what the businesses would pay a telephone network 230 to complete the calls, the businesses would have a financial incentive to ensure that the system knows the IP addresses connected with the businesses.

As mentioned above, many businesses maintain toll free numbers that their customers user to reach the businesses. And as also mentioned above, when a caller uses a toll free number to reach a business, the caller pays nothing and the business pays all charges associated with the call. Those charges are typically greater than what the business would pay to simply receive a normally dialed telephone call.

If a user dials corporation X's toll free number on telephone one 200, a voice application performed on local device 210 would be responsible for outdialing the call. Normally, the voice application would connect the call to the telephone network 230, the call could be routed to corporation X through the telephone network 230, and corporation X would be responsible for paying a telephone carrier to connect the call.

However, with a system embodying the invention, it would be possible for a user to be connected to the business through the data network 220, without the involvement of the elements of a traditional PSTN, even when the user dials a business' toll free telephone number. To make this possible, the voice application performed on the local device 210 would need to know that corporation X can be reached entirely through the data network 220. Also, when a user dials the toll free telephone number for a business reachable through the data network 220, the voice application would need to set the telephone call up entirely through the data network 220, instead of through the telephone network 230.

To make all of this possible, the voice application would need to check, each time that a user dials a toll free number, to determine if the business connected with the toll free number is reachable through the data network. Here again, their may be a publically available directory that cross-references businesses, and their toll free numbers, to the IP addresses of the gateways maintained by those businesses. If a voice application consults this directory before placing a call to a toll free number, and finds that the business connected with the dialed toll free number is reachable through the data network, the voice application could connect the call through the data network, and the gateway maintained by the business, instead of through the telephone network 230. Thereby saving the business the charges that it would have paid to a telephone carrier for completing the toll free call.

Because of the lower cost of completing a call to a business in this fashion, the businesses may be willing to pay the system for connecting the call through the data network 220, instead of through the telephone network 230. A system embodying the invention could invite businesses to register for this as a service. And because businesses would have a financial incentive to ensure that calls are connected through the data network, one would expect businesses to register for this service. Part of registering for the service might be an agreement to pay the system for connecting calls through the data network, instead of through the telephone network. And so long as the charges paid to the system are lower than the charged the businesses would have to pay to a telephone carrier, one would expect the businesses to readily agree. Thus, connecting calls in this manner could provide a stream of revenue for the system.

Once multiple corporations have provided their destination IP addresses to the system, the system would be able to monitor when users are attempting to reach those corporations. This could be done by noting when a caller asks to be connected to one of the corporations using voice commands, by noting when users ask to be connected to a toll-free number of one of the corporations via voice commands, and by noting when a user hard dials a toll free number of one of the corporations. In all these instances, rather than placing a call through the telephone network 230, the system would instead connect the call to the corporation via the data network.

With a system configured as described above, the businesses would save the charges that would have otherwise been paid to a telephone carrier. But, in addition, connecting calls in this fashion would allow businesses to reduce the total number of separate telephone lines the business maintains to speak with customers. If a portion of the calls received from customers are delivered over the data network, one would expect the volume of calls received over the telephone network 230 to decline. Generally speaking, it will be less expensive to maintain the equipment used to receive a certain volume of calls over the data network 220, as compared to the cost of paying a telephone carrier to deliver the same volume of calls over the telephone network.

FIG. 4 also illustrates a user mobile computing device 250 which includes a cellular telephone. This device also includes a wireless IP transceiver that is capable of connecting to a wireless router. When such a device is within range of a wireless router that is connected to the data network 220, the IP transceiver would connect to the wireless router, and the device would also operate as both a local device and an audio interface. Thus, the mobile computing device would allow the user to utilize all of the services as other system users. And this would include the ability to place a call to a business via the data network 220, as opposed to through the telephone network 230. Thus, a business could also receive a call from a user of the mobile computing device 250, even when the caller dials the business' toll free number, without the need to pay a telephone carrier for completing the call.

Figure 5:
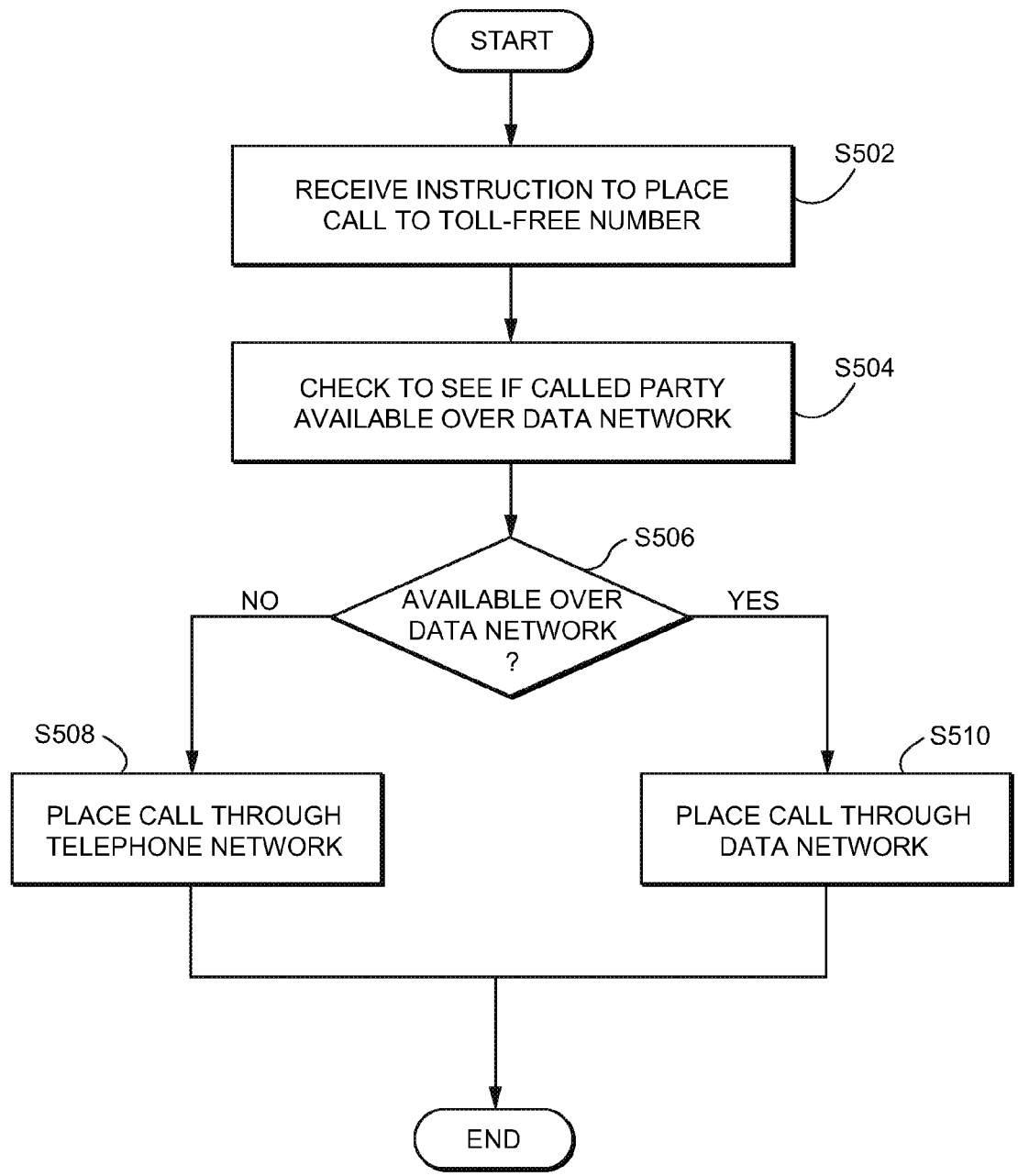
FIG. 5 illustrates steps of a method embodying the invention.

FIG. 5 illustrates steps of a method embodying the invention. The method starts in step S502 where a voice application running on a local device would receive an instruction to place a telephone call to a toll free number. A user could communicate these instructions to the voice application in any one of multiple different ways. For instance, the user could simply dial the telephone number on a telephone which is connected to the local device. In alternate embodiments, the user could speak a command to place a telephone call to a spoken number, and the voice application would interpret the spoken instruction and act upon it. In other embodiments, the user could simply ask to be connected to a particular business. In this instance, the voice application performed on the local device would need to obtain the telephone number corresponding to the business requested by the user. In many instances, the telephone number will be a toll free number maintained by that business.

In step S504, the system would check to determine if the business corresponding to the toll free number can be reached via the data network. This could involve examining a publically available directory which cross references business names with toll free telephone numbers and the IP addresses of data gateways which are maintained by the businesses. In other instances, the voice application could consult an internally maintained database which has been created by the overall system. In most instances, such a database would be stored on a remote server available to the voice application through the data network 220.

In step S506, the voice application would determine whether the party requested by the user is available through the data network. If not, in step S508, the voice application would place a telephone call through a normal telephone network connection. If the called party is available through the data network, in step S510, the voice application would set up the telephone call between the user's local device and the gateway maintained by the called business.

Another way that a system embodying the invention can be used to connect a user to services offered by a business is by performing a voice application created for a business. For instance, and as discussed above, with prior systems, if a user requests to be connected to the customer service department of a business, the system would connect the user to a customer service telephone line of the business. However, instead of connecting the user to a business through a telephone call to the business' customer service line, the system could instead begin to perform a voice application that has been created by or for the business.

In this scenario, the voice application that is performed for the user could mimic an interactive voice response system that a user would encounter if the user had placed a normal telephone call to the business' customer service line. In many instances, the user's needs could be satisfied by interacting with the voice application.

Moreover, because of the excellent speech recognition services that can be offered by a system embodying the invention, a voice application performed for a user might offer even better functionality than an IVR that the business offers through its customer service line. This would be particularly true for medium and smaller businesses that would not have the resources to deliver high end and complex speech recognition functionality on their customer service interactive voice application. For these reasons, once a business has created a voice application that can be launched when a user requests to be connected to the business, more of the user's needs could be satisfied by the voice application than would have been satisfied by an interactive voice response system offered through a telephone connection. And this could reduce the need for businesses to employ live operators, further reducing costs.

The voice application for a business could also act to establish a voice call between the user and a live operator whenever the voice application alone is not able to satisfy all of a customer's needs. However, until the voice call is established, the only message traffic passing back and forth between the user's local device and the business' systems would be asynchronous data communications necessary to provide the voice application with the information being requested by the user. Thus, the amount of data traffic carried over the data network would likely be far smaller in situations where a business' voice application is being performed for the user, as compared to a situation where the user is connected to the business' customer service line through the data network.

Figure 6:
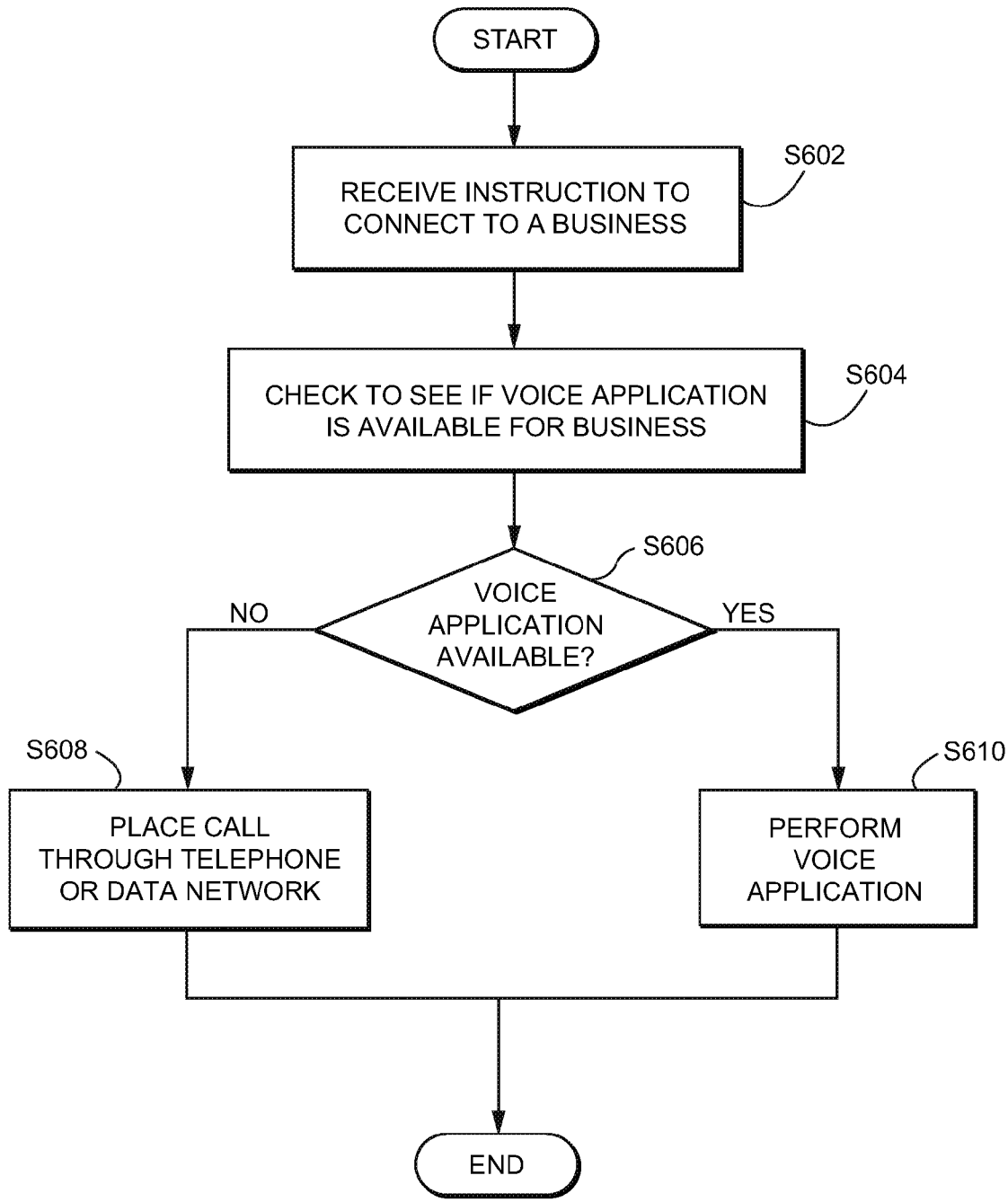
FIG. 6 illustrates steps of another method embodying the invention.

Another method embodying the invention where a voice application for a business is performed for the user is illustrated in FIG. 6. The method would start in step S602 when the system would receive a request to be connected to a business. In step S604, before attempting to establish a call to the business via either the telephone or data network, the system would first check to see is there is a voice application available for the business. If there is a voice application, in step S606, the method would branch to step S610, where the voice application would be performed for the user on the user's local device. On the other hand, if no voice application is available for the business, in step S608, the system would establish a telephone call to the business via either the telephone or the data network.

In some instances, there might be multiple different voice applications available for a business. If that is the case, the system could interact with the user to determine the most appropriate voice application to perform for the user.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although the invention has been described with reference to a number of illustrative embodiments thereof, it should be understood that numerous other modifications and embodiments can be devised by those skilled in the art that will fall within the spirit and scope of the principles of this disclosure. More particularly, reasonable variations and modifications are possible in the component parts and/or arrangements of the subject combination within the scope of the foregoing disclosure, the drawings and the appended claims without departing from the spirit of the invention. In addition to variations and modifications in the component parts and/or arrangements, alternative uses will also be apparent to those skilled in the art.

What is claimed is:

1. A method of responding to a user's request to communicate with a business, comprising:
   receiving a request from a user to communicate with a business, wherein the request is received by a local device;
   determining whether one or more voice applications that are relevant to goods or services provided by the business or whether a voice application specifically created for the business are available;
   performing, for the user, at least one voice application that either is relevant to the goods or services provided by the business or that has been specifically created for the business if a voice application relevant to the goods or services provided by the business or that has been specifically created for the business is available, wherein the voice application is performed, at least in part, on the local device; and
   establishing a communications channel between the user and the business if no voice application relevant to the goods or services provided by the business or that has been specifically created for the business is available.

2. The method of claim 1, wherein the request is received by a voice applications agent that is resident, at least in part, on a local device or a voice application that is performed by a voice applications agent that is resident, at least in part, on the local device, and wherein the determining step comprises determining, with the voice applications agent or the voice application, whether one or more voice applications that are relevant to the goods or services provided by the business or that have been specifically created for the business are available.

3. The method of claim 1, wherein the performing step comprises a voice applications agent that is resident, at least in part, on the local device performing the voice application.

4. The method of claim 1, wherein the receiving step comprises receiving a request to place a telephone call to a toll free number maintained by the business.

5. The method of claim 1, wherein the receiving step comprises receiving a request to place a telephone call to the business.

6. The method of claim 1, wherein the receiving step comprises receiving a spoken request from the user to communicate with the business, and wherein the determining step comprises interpreting the user's spoken request with a voice applications agent that is resident, at least in part, on the local device or a voice application that is performed by a voice applications agent that is resident, at least in part, on the local device to determine the identity of the business.

7. The method of claim 1, wherein if the determining step indicates that a plurality of voice applications that are relevant to the goods or services provided by the business are available, or that a plurality of voice applications that have been specifically created for the business are available, the method further comprises interacting with the user with a voice applications agent that is resident, at least in part, on the local device or a voice application that is performed by a voice applications agent that is resident, at least in part, on the local device to determine which of the plurality of voice applications should be performed for the user.

8. The method of claim 7, wherein interacting with the user comprises a voice applications agent that is resident, at least in part, on the local device or a voice application that is performed by a voice applications agent that is resident, at least in part, on the local device:
   playing audio to the user to ask the user for information;
   receiving a spoken response from the user;
   interpreting the user's spoken response; and
   determining which of the plurality of voice applications should be performed for the user based on the interpretation of the user's spoken response.

9. The method of claim 1, wherein the receiving step comprises receiving a spoken request from the user to communicate with the business, wherein the method further comprises:
   interpreting the user's spoken request with a voice applications agent that is resident, at least in part, on the local device or a voice application that is performed by a voice applications agent that is resident, at least in part, on the local device to determine a name of the business; and searching a contact list using the determined business name to identify a telephone number corresponding to the business name, and wherein the step of establishing a communications channel between the user and the business comprises placing a telephone call to the identified telephone number with a voice applications agent that is resident, at least in part, on the local device or a voice application that is performed by a voice applications agent that is resident, at least in part, on the local device.

10. The method of claim 9, wherein the step of placing a telephone call to the identified telephone number comprises establishing a Voice over Internet Protocol (VoIP) telephone call between the business and the user's local device via a data network.

11. The method of claim 10, further comprising billing the business for establishing the VoIP telephone call.

12. The method of claim 1, wherein if a voice application is performed for the user, the method further comprises establishing a communications channel between the user's local device and the business after the voice application has been performed.

13. The method of claim 12, wherein during the performance of the voice application, information is obtained from the user, and wherein the obtained information is used to determine a telephone number that is used to establish the communications channel between the user's local device and the entity after the voice application has been performed.

14. A non-transitory computer readable medium having instructions stored thereon, which when executed by one or more processors of a local device and/or one or more processors of at least one computer server in communication with the local device, cause the local device and/or the at least one computer server to perform a method comprising:

receiving a request from a user to communicate with a business, wherein the request is received by a local device;

determining whether one or more voice applications that are relevant to goods or services provided by the business or whether a voice application specifically created for the business are available;

performing, for the user, at least one voice application that either is relevant to the goods or services provided by the business or that has been specifically created for the business if a voice application that is relevant to the goods or services provided by the business or that has been specifically created for the business is available, wherein the voice application is performed on the local device; and establishing a communications channel between the user and the business if no voice application that is relevant to the goods or services provided by the business or that has been specifically created for the business is available.

15. The non-transitory computer readable medium of claim 14, wherein the request is received by a voice applications agent that is resident, at least in part, on a local device or a voice application that is performed by a voice applications agent that is resident, at least in part, on the local device, and wherein the determining step comprises determining, with the voice applications agent or the voice application, whether one or more voice applications that are relevant to the goods or services provided by the business or that were specifically created for the business are available.

16. The non-transitory computer readable medium of claim 14, wherein the performing step comprises a voice applications agent that is resident, at least in part, on the local device performing the voice application.

17. The non-transitory computer readable medium of claim 14, wherein the receiving step comprises receiving a spoken request from the user to communicate with the business, and wherein the determining step comprises interpreting the user's spoken request with a voice applications agent that is resident, at least in part, on the local device or a voice application that is performed by a voice applications agent that is resident, at least in part, on the local device to determine the identity of the business.

18. The non-transitory computer readable medium of claim 14, wherein if the determining step indicates that a plurality of voice applications that are relevant to the goods or services provided by the business or that were specifically created for the business are available, the method performed by local device and/or the at least one computer server further comprises interacting with the user with a voice applications agent that is resident, at least in part, on the local device or a voice application that is performed by a voice applications agent that is resident, at least in part, on the local device to determine which of the plurality of voice applications should be performed for the user.

19. The non-transitory computer readable medium of claim 18, wherein interacting with the user comprises a voice applications agent that is resident, at least in part, on the local device or a voice application that is performed by a voice applications agent that is resident, at least in part, on the local device:

playing audio to the user to ask the user for information;
receiving a spoken response from the user;
interpreting the user's spoken response; and
determining which of the plurality of voice applications should be performed for the user based on the interpretation of the user's spoken response.

20. The non-transitory computer readable medium of claim 14, wherein the receiving step comprises receiving a spoken request from the user to communicate with the business, and wherein the method performed by the local device and/or the at least one computer server further comprises:

interpreting the user's spoken request with a voice applications agent that is resident, at least in part, on the local device or a voice application that is performed by a voice applications agent that is resident, at least in part, on the local device to determine a name of the business; and searching a contact list using the determined business name to identify a telephone number corresponding to the business name, and wherein the step of establishing a communications channel between the user and the business comprises placing a telephone call to the identified telephone number with a voice applications agent that is resident, at least in part, on the local device or a voice application that is performed by a voice applications agent that is resident, at least in part, on the local device.

21. The non-transitory computer readable medium of claim 20, wherein the step of placing a telephone call to the identified telephone number comprises establishing a Voice over Internet Protocol (VoIP) telephone call between the business and the user's local device via a data network.

22. The non-transitory computer readable medium of claim 21, wherein the method further comprises billing the entity for establishing the VoIP telephone call.

23. The non-transitory computer readable medium of claim 14, wherein if a voice application is performed for the user, the method performed by the local device and/or the at least one computer server further comprises establishing a communications channel between the user's local device and the business after the voice application has been performed.

24. The method of claim 1, wherein the determining step comprises determining whether one or more voice applications that have been specifically created for the business are available, and wherein the performing step comprises performing at least one voice application that has been specifically created for the business if such a voice application is available.

25. The non-transitory computer readable medium of claim 14, wherein the determining step of the method that is performed comprises determining whether one or more voice applications that have been specifically created for the business are available, and wherein the performing step of the method that is performed comprises performing at least one voice application that has been specifically created for the business if such a voice application is available.

* * * * *